United States Patent
Zhang et al.

(10) Patent No.: US 12,358,135 B2
(45) Date of Patent: Jul. 15, 2025

(54) INFORMATION PROCESSING METHOD, TASK EXECUTION METHOD, APPARATUS, DEVICE AND MEDIUM

(71) Applicant: Beijing Youzhuju Network Technology Co., Ltd., Beijing (CN)

(72) Inventors: Hanbo Zhang, Beijing (CN); Xinghang Li, Beijing (CN); Minghuan Liu, Beijing (CN); Jie Xu, Beijing (CN); Hongtao Wu, Beijing (CN); Ya Jing, Beijing (CN); Chilam Cheang, Beijing (CN); Tao Kong, Beijing (CN); Hang Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/900,502

(22) Filed: Sep. 27, 2024

(65) Prior Publication Data
US 2025/0018567 A1   Jan. 16, 2025

(30) Foreign Application Priority Data

Sep. 28, 2023  (CN) .......................... 202311280845.6

(51) Int. Cl.
*B25J 9/16*       (2006.01)
*G06F 40/284*   (2020.01)
*G06V 10/80*    (2022.01)

(52) U.S. Cl.
CPC ........... *B25J 9/1661* (2013.01); *B25J 9/1697* (2013.01); *G06F 40/284* (2020.01); *G06V 10/803* (2022.01)

(58) Field of Classification Search
CPC ..... B25J 9/1661; B25J 9/1697; G06F 40/284; G06V 10/803
See application file for complete search history.

(56) References Cited

U.S. PATENT DOCUMENTS 12,119,848 B1 * 10/2024 Li ...................... H03M 7/6011

FOREIGN PATENT DOCUMENTS

CN          115861596 A        3/2023

OTHER PUBLICATIONS

Pierre-Louis Guhur et al, "Instruction-driven history-aware policies for robotic manipulations", 2022, 6th Conference on Robot Learning (CoRL 2022) (13 Pages) (Year: 2022).*

* cited by examiner

*Primary Examiner* — David F Dunphy

(57) ABSTRACT

The present application discloses an information processing method, a task execution method, an apparatus, a device and a medium. The method includes: processing, through a target visual encoding model in a target analysis model, obtained image information to be analyzed, to obtain a corresponding target sequence; fusing, through a target feature fusion model in the target analysis model, the target sequence and obtained text information to be analyzed, to obtain a target fusion result; processing the target fusion result through a target task analysis model in the target analysis model to obtain target task information; and controlling the action execution apparatus to perform an action corresponding to the target task information. The target analysis model is obtained by training an initial analysis model and the initial analysis model comprises an initial visual encoding model and an initial feature fusion model.

17 Claims, 4 Drawing Sheets

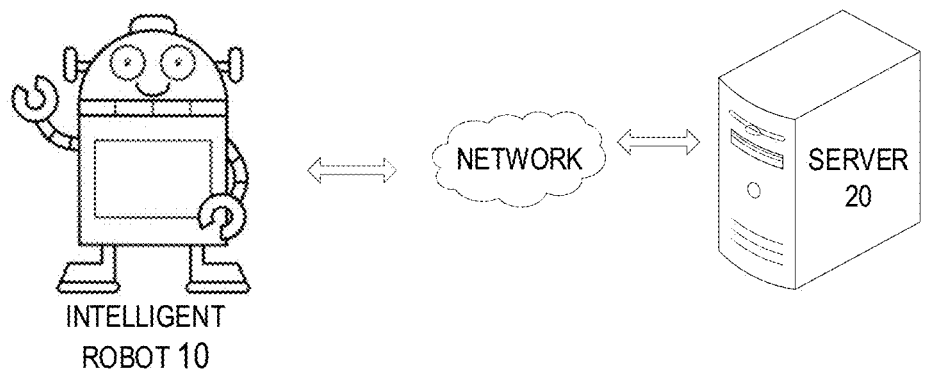

FIG. 1

```
PROCESS, THROUGH A TARGET VISUAL ENCODING MODEL IN A TARGET ANALYSIS MODEL,
OBTAINED IMAGE INFORMATION TO BE ANALYZED, TO OBTAIN A CORRESPONDING TARGET      ─ S201
SEQUENCE, THE IMAGE INFORMATION TO BE ANALYZED COMPRISING ENVIRONMENT IMAGE
INFORMATION OF AN ENVIRONMENT IN WHICH AN ACTION EXECUTION APPARATUS IS
LOCATED AND IMAGE INFORMATION OF THE ACTION EXECUTION APPARATUS
```

```
FUSE, THROUGH A TARGET FEATURE FUSION MODEL IN THE TARGET ANALYSIS MODEL,        ─ S202
THE TARGET SEQUENCE AND OBTAINED TEXT INFORMATION TO BE ANALYZED, TO OBTAIN
A TARGET FUSION RESULT, THE TEXT INFORMATION TO BE ANALYZED CORRESPONDING TO
THE IMAGE INFORMATION TO BE ANALYZED
```

```
                                                                                  S203
PROCESS THE TARGET FUSION RESULT THROUGH A TARGET TASK ANALYSIS MODEL IN
THE TARGET ANALYSIS MODEL TO OBTAIN TARGET TASK INFORMATION
```

```
                                                                                  S204
CONTROL THE ACTION EXECUTION APPARATUS TO PERFORM AN ACTION CORRESPONDING
TO THE TARGET TASK INFORMATION
```

FIG. 2a

INFORMATION PROCESSING METHOD, TASK EXECUTION METHOD, APPARATUS, DEVICE AND MEDIUM

CROSS-REFERENCE

The present application claims priority to Chinese Patent Application No. 202311280845.6, filed on Sep. 28, 2023, and entitled "INFORMATION PROCESSING METHOD, TASK EXECUTION METHOD, APPARATUS, DEVICE AND MEDIUM", the entirety of which is incorporated herein by reference.

FIELD

The present application belongs to the field of intelligent control, and particularly relates to an information processing method, a task execution method, an apparatus, a device and a medium.

BACKGROUND

The visual language model is a deep learning model capable of simultaneously processing images and texts, and may be used for various visual language tasks. In the related art, the visual language model may be integrated into the robot, so that the robot may understand the task execution instruction and perform a corresponding action after receiving the task execution instruction. In order to have good cognitive intelligence and motion intelligence capability when controlling the robot to execute the target of the corresponding task based on the visual language model, a huge number of training data need to be collected and a huge computing resource need to be occupied when the visual language model is being trained. For the visual language model training process, the time consumption and the resource consumption are relatively large, and the data processing efficiency is relatively low.

SUMMARY

Embodiments of the present application provide a solution different from the related art, and aim to solve the technical problems of relatively large consumption time, relatively large resource consumption and relatively low data processing efficiency in a visual language model training process in the related art.

According to a first aspect, the present application provides an information processing method, including: processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus; fusing, through a target feature fusion model in the target analysis model, the target sequence and obtained text information to be analyzed, to obtain a target fusion result, the text information to be analyzed corresponding to the image information to be analyzed; processing the target fusion result through a target task analysis model in the target analysis model to obtain target task information; and controlling the action execution apparatus to perform an action corresponding to the target task information. The target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training.

According to a second aspect, the present application provides a task execution method applicable to an intelligent robot, including: obtaining text information inputted by an object; collecting image information to be analyzed corresponding to the text information, the image information to be analyzed comprising environment image information of an environment in which an action execution apparatus is located and image information of the action execution apparatus; inputting the image information to be analyzed to the target analysis model to obtain corresponding target task information; controlling the action execution apparatus to perform an action corresponding to the target task information, wherein the target analysis model is the target analysis model according to the first aspect.

According to a third aspect, the present application provides an information processing apparatus, including: a visual processing unit, configured for processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus; a feature fusion unit, configured for fusing, through a target feature fusion model in the target analysis model, the target sequence and obtained text information to be analyzed, to obtain a target fusion result; a task analysis unit, configured for processing the target fusion result through a target task analysis model in the target analysis model to obtain target task information; and a first execution unit, configured for controlling the action execution apparatus to perform an action corresponding to the target task information. The target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training.

According to a fourth aspect, the present application provides an electronic device, including: a processor; and a memory configured to store executable instructions of the processor. The processor is configured to perform, by executing the executable instructions, a method according to any one of the first aspect, the second aspect, possible implementations of the first aspect, or possible implementations of the second aspect.

According to a fifth aspect, an embodiment of the present application provides a computer-readable storage medium, having a computer program stored thereon, wherein the computer program, when executed by a processor, implements a method according to any one of the first aspect, the second aspect, possible implementations of the first aspect, or possible implementations of the second aspect.

According to the present application, through a target visual encoding model in a target analysis model, obtained image information to be analyzed is processed to obtain a corresponding target sequence, the image information to be analyzed comprises environment image information of an environment in which an action execution apparatus is located and image information of the action execution apparatus; through a target feature fusion model in the target analysis model, the target sequence and obtained text information to be analyzed are fused to obtain a target fusion result, the text information to be analyzed corresponds to the image information to be analyzed; the target fusion result is processed through a target task analysis model in the target analysis model to obtain target task information; and the action execution apparatus is controlled to perform an action corresponding to the target task information; wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training. Thereby, when the target analysis model is obtained through training the initial analysis model, the training data and the training time for the initial visual encoding model or the initial feature fusion model can be reduced significantly, and the data volume and the training time required for the training process of the target analysis model can be greatly reduced. Thereby, the amount of training data required for the training process of the target analysis model can be reduced, and the training efficiency of the target analysis model can be improved.

BRIEF DESCRIPTION OF DRAWINGS

In order to more clearly illustrate the technical solutions in the embodiments of the present application or related art, the accompanying drawings used in the description of the embodiments or related art are briefly described below. It is obvious that the drawings in the following description are some embodiments of the present application, and for those skilled in the art, other drawings may be obtained based on these drawings without creative work. In the drawings:

FIG. 1 is a schematic structural diagram of a system according to an embodiment of the present application;

FIG. 2a is a schematic flowchart of an information processing method according to an embodiment of the present application;

DETAILED DESCRIPTION

Figure 2B:
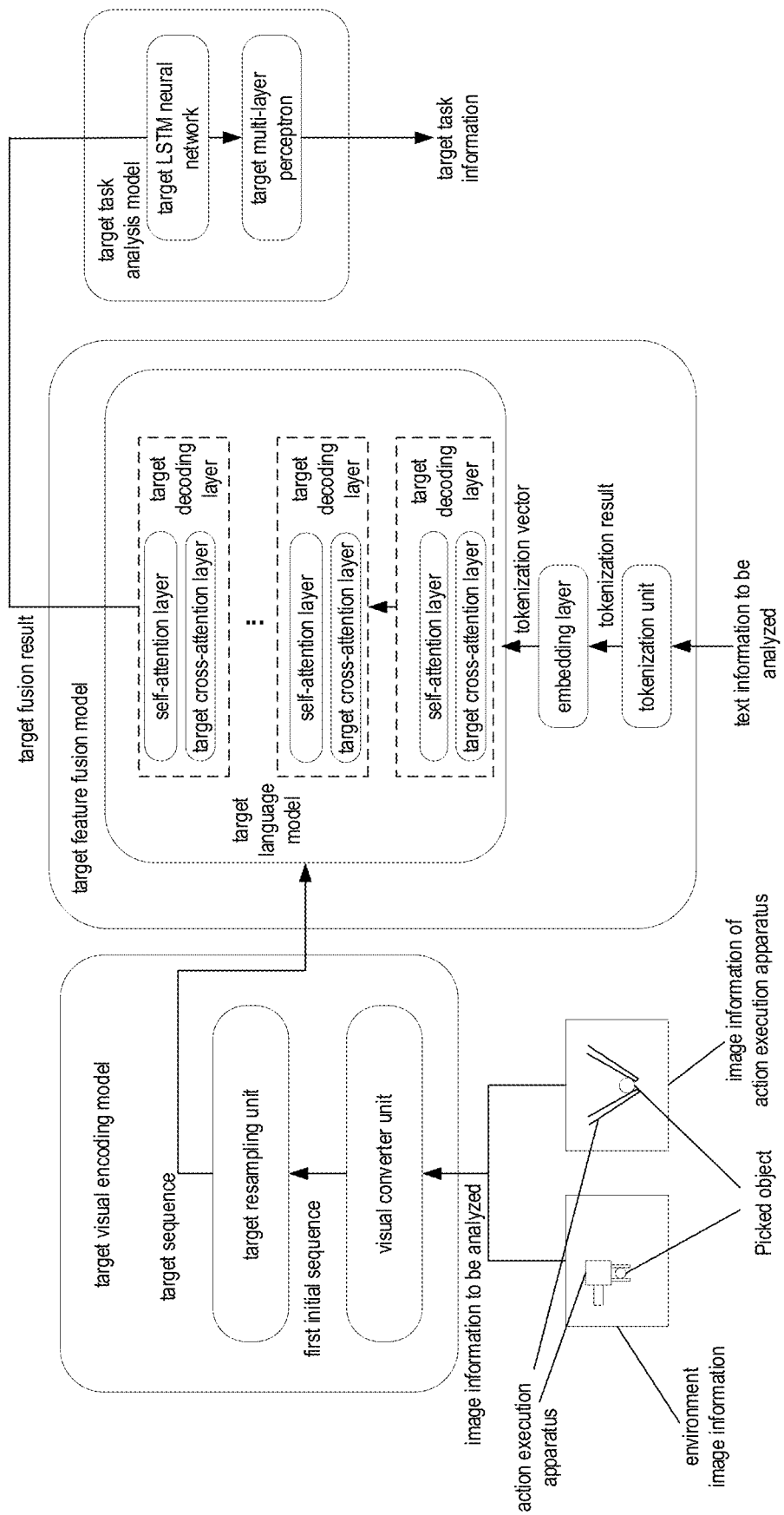
FIG. 2b is a schematic diagram of a data flow processing scenario of an information processing method according to an embodiment of the present application.

Embodiments of the present application are described in detail below, examples of which are shown in the accompanying drawings. The embodiments described below with reference to the accompanying drawings are example, and are intended to be used for explaining the present application and should not be construed as limiting the present application.

The terms "first" and "second" in the embodiments of the present application are used to distinguish similar object, and are not necessarily used to describe a specific order or an order of sequence. It should be understood that such used data may be interchanged where appropriate so that embodiments of the embodiments of the present application described herein can be implemented in an order other than those illustrated or described herein. Moreover, the terms "comprise" and "have" and any variation thereof are intended to cover a non-exclusive inclusion, e.g., a process, method, system, product, or apparatus that includes a series of steps or units is not necessarily limited to those steps or units expressly listed, but may include other steps or units not expressly listed or inherent to such process, method, product, or device.

First, some terms in the embodiments of the present application are explained below to facilitate understanding by those skilled in the art.

MCIL: a framework combining multitasking imitation and free-form text conditioned reflex. It is an extensible framework, may learn visual motion strategies under specific language conditions, and may follow multiple user instructions for a long time in a dynamic and accurate 3D desktop environment.

HULC is a hierarchical approach, and is a method of combining different observations and action spaces, auxiliary losses, and latent representations.

RT-1: a robot transformation decoder layer. It is a method for jointly modeling vision, language input and action in the marked space. RT-1 may improve the perception and decision capability of the robot, and thereby realizing more natural interaction.

FIG. 1 is a schematic structural diagram of a system according to an example embodiment of the present application.

The intelligent robot 10 includes an action execution apparatus, and is integrated with a target analysis model. It may receive text information inputted by an object, and collect image information to be analyzed corresponding to the text information; input the image information to be analyzed into the target analysis model to obtain corresponding target task information; and control the action execution apparatus to perform an action corresponding to the target task information. The image information to be analyzed includes environment image information of an environment in which the action execution apparatus is located and image information of the action execution apparatus.

The above-mentioned object may refer to a user, or may trigger a predetermined instruction of the text information input action.

The above-mentioned target analysis model may be built in the intelligent robot 10.

The above-mentioned action execution apparatus may be a device having an ability to hold or grip an object.

In some embodiments, the above-mentioned target analysis model may be obtained from the server 20 by the intelligent robot 10. In this case, the server 10 is configured for: obtaining sample image information, the sample image information comprising environment image information of an environment in which a sample action execution apparatus is located and image information of the sample action execution apparatus; processing the sample image information through the initial visual encoding model to obtain a corresponding target sample sequence; fusing the target sample sequence and obtained sample text information through the initial feature fusion model to obtain a target sample fusion result, the sample text information corresponding to the sample image information; processing the target sample fusion result through the initial task analysis model to obtain predicted task information; obtaining predetermined label task information corresponding to the sample image information; determining a corresponding loss result based on the label task information and the predicted task information; and training the initial analysis model based on the loss result to obtain the target analysis model.

In some further embodiments, the target analysis model may further be obtained by training the intelligent robot itself.

The execution principle and interaction process of the components (such as the intelligent robot 10 and the server 20) in the embodiment of this system may refer to the following descriptions of the method embodiments.

FIG. 2*a* is a schematic flowchart of an information processing method according to an example embodiment of the present application. This method can be executed by the intelligent robot 10 or jointly executed by the intelligent robot 10 and the server 20. Optionally, the intelligent robot may refer to a mechanical device equipped with perception, decision, and action execution capability, and further equipped with an action execution apparatus to implement the action execution capability. The intelligent robot 10 may emulate or perform behaviors and tasks.

The target analysis model may be built in the intelligent robot 10. As shown in FIG. 2*b*, the target analysis model may include a target visual encoding model, a target feature fusion model, and a target task analysis model. The intelligent robot 10 includes an action execution apparatus.

Optionally, the information processing method may include at least the following S201-S204 comprising:

S201: process, through a target visual encoding model in a target analysis model, obtained image information to be analyzed, to obtain a corresponding target sequence, the image information to be analyzed comprising environment image information of an environment in which an action execution apparatus is located and image information of the action execution apparatus.

The environment image information of the environment in which the action execution apparatus is located may be collected by a photographing device disposed on the face of the intelligent robot, and the image information of the action execution apparatus may be collected by a photographing device disposed on the action execution apparatus of the intelligent robot.

In some embodiments, the action execution apparatus may be some action execution objects having an action execution function, and the action execution objects may execute an action corresponding to the action execution instruction based on the obtained action execution instruction. The action execution instruction is an instruction used to instruct the action execution object to perform a corresponding action.

Optionally, the action execution object may be an intelligent robot, a robot arm of the intelligent robot, a manipulator, a gripper, or the like.

Optionally, the action execution instruction may be an instruction instructing the action execution object to hold, or grip the object, an instruction instructing the action execution object to take a predetermined posture, an instruction instructing the action execution object to move, or the like.

In some embodiments, the environment in which the action execution apparatus is located refers to a spatial area in which the action execution apparatus is located. The environment image information of the environment in which the action execution apparatus is located refers to image information in a spatial area where the action execution apparatus is located. The image information in the spatial region where the action execution apparatus is located may include image information of the action execution apparatus itself, or may not include image information of the action execution apparatus itself. The image information of the action execution apparatus itself may include image information of a target working state of the action execution apparatus.

The image information of the action execution apparatus includes image information of the action execution apparatus itself.

The target working state includes a pick-up status and a non-pick-up status. When the target working state is the pick-up state, the action execution apparatus is in a state with the object being held, or a state with the object being gripped. When the target working state is the non-pick-up state, the action execution apparatus is in a state without the object being held, or a state without the object being gripped.

Optionally, when the action execution apparatus is a gripper, the action execution apparatus being in state without the object being gripped means that the gripper is in an open state, and the action execution apparatus is a state with the object being gripped means the gripper is in a closed state.

Optionally, the spatial region may be a room region, a street region, or the like.

In some optional embodiments of the present application, the target visual encoding model includes a visual converter unit and a target resampling unit, and in the foregoing S201, processing, through the target visual encoding model in the target analysis model, the obtained image information to be analyzed to obtain the corresponding target sequence includes the following S2011-S2012.

S2011: process the image information to be analyzed through the visual converter unit to obtain a corresponding first initial sequence.

The visual converter unit is a unit for visual processing tasks, such as image recognition. The visual converter unit may be a Visual Transformer (ViT).

The first initial sequence may be a sequence composed of a plurality of labels, each label is used to indicate image feature information of image information to be analyzed. The image feature information may refer to a grayscale distribution, an image size, a pixel value distribution, or the like.

Specifically, processing the image information to be analyzed through the visual converter unit to obtain the corresponding first initial sequence may be implemented with the following formula (1):

$$v_{t1}, v_{t2}, \ldots, v_{tN} = ViT(V_t) \qquad (1)$$

wherein $V_t$ represents image information to be analyzed that is collected at time t, $v_{t1}, v_{t2}, \ldots, v_{tN}$ represents a first initial sequence, and N represents the total number of marks in the first initial sequence.

In the present application, t may be one of collection times at which the action execution apparatus needs to collect multiple images and text information to be analyzed for executing a complete action.

S2012: resample the first initial sequence through the target resampling unit to obtain the target sequence.

The target resampling unit in the present application may refer to a Resampler. The target resampling unit may employ a 6-layer BERT structure, perform resampling on the first initial sequence, so as to reduce a length of a representation of the image information to be analyzed, and thus improve efficiency of subsequent data processing.

Optionally, resampling the first initial sequence through the target resampling unit to obtain the target sequence may be implemented with the following formulas (2) and (3):

$$K_R = VW_K^R, \quad (2)$$
$$V_R = VW_V^R,$$
$$A(Q_R, K_R, V_R) = \text{softmax}\left(\frac{Q_R K_R^T}{\sqrt{d1}}\right)V_R$$
$$V_{enc} = A(Q_R, K_R, V_R) \quad (3)$$

where V represents the first initial sequence, i.e., $v_{t1}, v_{t2}, \ldots, v_{tN}$, $Q_R \in R^{K \times d}$ is a predetermined parameter in the target resampling unit and is used as a query vector, d1 is a predetermined first dimension size, $W_K^R, W_V^R \in R^{d_v \times d}$ is a linear transformation matrix representing key values, $d_v$ is a predetermined feature dimension, $K_R$ and $V_R$ are the transformed key value vectors after the target resampling unit inputs V, and $V_{enc}$ is a target sequence.

S202, fuse, through a target feature fusion model in the target analysis model, the target sequence and obtained text information to be analyzed, to obtain a target fusion result, the text information to be analyzed corresponding to the image information to be analyzed.

Optionally, the target fusion result may be further processed with a pooling layer.

The text information to be analyzed corresponding to the image information to be analyzed may mean that a collection time of the text information to be analyzed is the same as that of the image information to be analyzed.

In some optional embodiments of the present application, the target feature fusion model includes a tokenization unit, an embedding layer, and a target language model.

In the foregoing S202, fusing, through the target feature fusion model in the target analysis model, the target sequence and the obtained text information to be analyzed, to obtain the target fusion result includes S2021-S2023:

S2021: perform tokenization processing on the obtained text information to be analyzed through the tokenization unit to obtain a tokenization result.

In some optional embodiments, the text information to be analyzed is used to determine the action execution instruction. Specifically, the action execution instruction may determine, according to the text information to be analyzed, that the action corresponding to the action execution instruction is an action that the text information to be analyzed indicate the action execution object to perform.

For example, when the text information to be analyzed is: "take an egg into the bowl", the action performed by the action execution object is to take the egg into the bowl.

The tokenization unit may be a Tokenizer, that is, a lexical analyzer.

The tokenization result is a word sequence obtained after the tokenization unit separates the text information to be analyzed, and the word sequence includes a plurality of words.

S2022: process the tokenization result through the embedding layer to obtain a corresponding tokenization vector.

The embedding layer in the present application refers to an embedding layer.

S2023: processing the tokenization vector and the target sequence through the target language model to obtain the target fusion result.

In some optional embodiments of the present application, the target language model may be a LLM (Large Language Model).

In some optional embodiments of the present application, further referring to FIG. 2b, the target language model includes a plurality of target decoding layers, and each target decoding layer includes a target cross-attention layer and a self-attention layer.

In the foregoing S2023, processing the tokenization vector and the target sequence through the target language model to obtain the target fusion result includes the following S20231-S20233:

S20231, process the tokenization vector and the target sequence through a target cross-attention layer in the first target decoding layer among the plurality of target decoding layers to obtain a corresponding third output result; and process the third output result through a self-attention layer in the first target decoding layer to obtain a first fusion result.

The target cross-attention layer in the present application is a gated cross-attention layer.

In some optional embodiments, processing the tokenization vector and the target sequence through a target cross-attention layer in the first target decoding layer among the plurality of target decoding layers to obtain a corresponding third output result may be implemented with the following formulas (4) and (5):

$$A(X^l W_Q^C, V_{enc} W_K^C, V_{enc} W_V^C) = \text{softmax}\left(\frac{X^l W_Q^C (V_{enc} W_K^C)^T}{\sqrt{d2}}\right) V_{enc} W_V^C \quad (4)$$

$$\hat{X}^l = \text{Tanh}(\alpha) MLP(A(X^l W_Q^C, V_{enc} W_K^C, V_{enc} W_V^C)) + X^l \quad (5)$$

where $X^l$ represents a tokenization vector, $V_{enc}$ represents a target sequence, $W_Q^C, W_K^C, W_V^C \in R^{d \times d}$ represent parameters in the target cross-attention layer, MLP represents a multi-layer perceptron network, d2 is a predetermined second dimension size, and the first dimension size may be the same as or different from the second dimension size. $\hat{X}^l$ represents the third output result, $\alpha \in R$. a is a predetermined gating parameter. Furthermore, processing the third output result through a self-attention layer in the first target decoding layer to obtain a first fusion result may be implemented with the following formulas (6) and (7):

$$A(\hat{X}^l W_Q^S, \hat{X}^l W_K^S, \hat{X}^l W_V^S) = \text{softmax}\left(\frac{\hat{X}^l W_Q^S (\hat{X}^l W_K^S)^T}{\sqrt{d2}}\right) \hat{X}^l W_V^S \quad (6)$$

$$X^{l+1} = MLP(A(\hat{X}^l W_Q^S, \hat{X}^l W_K^S, \hat{X}^l W_V^S)) + \hat{X}^l \quad (7)$$

where $X^{l+1}$ represents the first fusion result, MLP represents a multi-layer perceptron network, $\hat{X}^l$ represents a third output result, and $W_Q^S$, $W_K^S$, $W_V^S$ are parameters in the self-attention layer.

S20232: process the first fusion result and the target sequence through a target cross-attention layer in the second target decoding layer among the plurality of target decoding layers to obtain a corresponding fourth output result; and process the fourth output result through a self-attention layer in the second target decoding layer to obtain a second fusion result.

It should be noted that the respective initial decoding layers in the plurality of initial decoding layers have the same structure.

S20233: determine whether a loop of all target decoding layers in the plurality of target decoding layers is completed; in accordance with a determination that the loop is completed, take the second fusion result as the target fusion result; in accordance with a determination that the loop is not completed, determine the second target decoding layer as a new second target decoding layer, take the second fusion result as a new first fusion result, and return to the step of processing the first fusion result and the target sequence through a target cross-attention layer in the second target decoding layer among the plurality of target decoding layers until the target fusion result is determined.

The number of decoding layers in the plurality of target decoding layers may be a predetermined value, for example, may be 32.

Optionally, the target feature fusion model may also merely include the target language model, while the embedding layer and the tokenization unit may be external units belonging to the target feature fusion model.

S203: process the target fusion result through a target task analysis model in the target analysis model to obtain target task information.

In some embodiments, the target task information includes target pose information of the action execution apparatus and a target work state of the action execution apparatus, and the target work state includes a pick-up state and a non-pick-up state.

In the foregoing S204, controlling the action execution apparatus to perform the action corresponding to the target task information includes the following S2041-S2042:

S2041: adjust a current pose of the action execution apparatus to be a pose corresponding to the target pose information.

Optionally, the target pose information may be 6 DOF information, and specifically, may be three-dimensional coordinate information of the action execution apparatus, and rotation angle information around each coordinate axis.

S2042: adjust a current working state of the action execution apparatus to be the target working state.

In some alternative embodiments of the present application, the target task analysis model includes a target long short-term memory neural network and a target multilayer perceptron. In S203, and processing the target fusion result through the target task analysis model in the target analysis model to obtain the target task information includes the following S2031-S2033:

S2031: obtain historical feature information, the historical feature information being a first output result based on the target long short-term memory neural network at the last time.

S2032: process the target fusion result and the historical feature information through the target long short-term memory neural network to obtain a second output result.

Optionally, processing the target fusion result and the historical feature information through the target long short-term memory neural network to obtain a second output result may be implemented with the following formula (8):

$$h_t = LSTM\left(\hat{X}_t, h_{t-1}\right) \qquad (8)$$

where $h_t$ represents the second output result, $h_{t-1}$ represents historical feature information, where when t is 1, $h_{t-1}$ may be 0, or may be a further value randomly set.

In the present application, t refers to the t-th moment.

S2033: process the second output result through the target multi-layer perceptron to obtain the target task information.

Optionally, in S2033, processing the second output result through the target multi-layer perceptron to obtain the target task information may be implemented with the following formula (9):

$$task_t = MLP(h_t) \qquad (9)$$

where $h_t$ represents the second output result, $task_t$ represents the target task information. The target task information may include target pose information $a_t^{pose}$ of the action execution apparatus and a target working state $a_t^{gripper}$ of the action execution apparatus.

S204: control the action execution apparatus to perform an action corresponding to the target task information.

The target analysis model is obtained by training an initial analysis model. The initial analysis model comprises an initial visual encoding model and an initial feature fusion model. When the initial analysis model is trained to be the target analysis model, the initial visual encoding model is trained to be the target visual encoding model, and the initial feature fusion model is trained to be the target feature fusion model. At least one of the initial visual encoding model or the initial feature fusion model is obtained by pre-training.

The target analysis model adopts a structure in which the perception module (the target visual encoding model and the target feature fusion model) and the strategy module (task analysis model) is separated, and the main calculation is concentrated on the perception module, hence the next action may be predicted through the strategy module to execute open-loop control without the perception module participating in the calculation, so that the inference time of the target analysis model is reduced, and the inference speed of the target analysis model may be linearly improved.

According to the present application, through a target visual encoding model in a target analysis model, obtained image information to be analyzed is processed to obtain a corresponding target sequence, the image information to be analyzed comprises environment image information of an environment in which an action execution apparatus is located and image information of the action execution apparatus; through a target feature fusion model in the target analysis model, the target sequence and obtained text information to be analyzed are fused to obtain a target fusion result, the text information to be analyzed corresponds to the image information to be analyzed; the target fusion result is processed through a target task analysis model in the target analysis model to obtain target task information; and the action execution apparatus is controlled to perform an action corresponding to the target task information; wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training. Thereby, when the target analysis model is obtained through training the initial analysis model, the training data and the training time for the initial visual encoding model or the initial feature fusion model can be reduced significantly, and the data volume and the training time required for the training process of the target analysis model can be greatly reduced. Thereby, the amount of training data required for the training process of the target analysis model can be reduced, and the training efficiency of the target analysis model can be improved.

In some optional embodiments of the present application, for the training process of the target analysis model, the method further includes the following S01-S07:

S01: obtain sample image information, the sample image information comprising environment image information of an environment in which a sample action execution apparatus is located and image information of the sample action execution apparatus.

In some embodiments, the sample action execution apparatus may also be some sample action execution objects having an action function, and the sample action execution objects may perform an action corresponding to the sample action execution instruction according to the obtained sample action execution instruction. The sample action execution instruction is used to instruct the sample action execution object to perform a corresponding action.

Optionally, the sample action execution object may be a robot, a mechanic arm of the robot, a game character, or a palm of a game character.

Optionally, the sample action execution instruction may be an instruction instructing the sample action execution object to grab the item, an instruction instructing the sample action execution object to take the predetermined pose, an instruction instructing the sample action execution object to move, or the like.

In some embodiments, the environment in which the sample action execution apparatus is located refers to a spatial area in which the sample action execution apparatus is located. The environment image information of the environment in which the sample action execution apparatus is located refers to image information in a spatial area where the sample action execution apparatus is located. The image information in the spatial region where the sample action execution apparatus is located may include image information of the sample action execution apparatus itself, or may not include image information of the sample action execution apparatus itself.

Optionally, the spatial region may be a room region, a street region, or the like.

In some embodiments, the image information of the sample action execution apparatus includes image information of the sample action execution apparatus itself.

S02: process the sample image information through the initial visual encoding model to obtain a corresponding target sample sequence.

Specifically, the initial visual encoding model belongs to one unit in the initial analysis model, and the initial analysis model includes an initial visual encoding model, an initial feature fusion model, and an initial task analysis model.

The initial visual encoding model includes a visual converter unit and an initial resampling unit. In the foregoing S02, processing the sample image information through the initial visual encoding model to obtain a corresponding target sample sequence includes S021-S022:

S021: process the sample image information through the visual converter unit to obtain a corresponding first sample initial sequence.

S022: resample the first sample initial sequence through the initial resampling unit to obtain the sample target sequence.

It should be noted that, when the initial analysis model is trained to be the target analysis model, the initial resampling unit is trained to be the target resampling unit. At least one of $W_K^R$, $W_V^R$, $Q_R$ in the foregoing formula (2) is trained and obtained from the process of training the initial resampling unit to be the target resampling unit. That is, in the process of training the target analysis model, the foregoing $W_K^R$, $W_V^R$ are adjustable parameters.

S03, fuse the target sample sequence and obtained sample text information through the initial feature fusion model to obtain a target sample fusion result, the sample text information corresponding to the sample image information. In some optional embodiments of the present application, the initial feature fusion model includes a tokenization unit, an embedding layer, and an initial language model. When the initial analysis model is trained to be a target analysis model, the initial language model is trained to be a target language model.

The sample text information may be converted from sample voice information.

In the foregoing S03, fusing the target sample sequence and obtained sample text information through the initial feature fusion model to obtain a target sample fusion result includes the following S031-S033:

S031: perform tokenization processing on the obtained sample text information through the tokenization unit to obtain a tokenization result.

In some optional embodiments, the sample text information is used to determine the foregoing sample action execution instruction. Specifically, the sample action execution instruction may determine, according to the sample text information, that the action corresponding to the sample action execution instruction is an action that the sample text information indicate the sample action execution object to perform.

For example, when the sample text information is: "take an egg into the bowl", the action performed by the sample action execution object is to take the egg into the bowl.

For example, when the sample text information is "discard the garbage", the action performed by the sample action execution object is to discard the garbage.

The tokenization unit may be a Tokenizer, that is, a lexical analyzer.

The tokenization result in S031 is a word sequence obtained after performing tokenization on sample text information, and the word sequence includes a plurality of words.

S032: process the tokenization result through the embedding layer to obtain a corresponding tokenization vector.

Each word included in the tokenization result corresponds to one tokenization vector.

The embedding layer in the present application refers to an embedding layer.

S033: process the tokenization vector and the target sequence through the initial language model to obtain the initial fusion result.

In some optional embodiments of the present application, the initial language model may be a Large Language Model (LLM).

In some alternative embodiments of the present application, the initial language model includes a plurality of initial decoding layers, and each initial decoding layer includes an initial cross-attention layer and a self-attention layer.

Optionally, when the initial analysis model is trained to be the target analysis model, each initial decoding layer is trained to be a corresponding target decoding layer. In the foregoing formulas (4) to (7), $W_Q^C$, $W_K^C$, $W_V^C$, $W_Q^S$, $W_K^S$, $W_V^S$, $\alpha$ is trained and obtained in the process of training the initial decoding layer to be the target decoding layer, that is, at least one of the foregoing $W_Q^C$, $W_K^C$, $W_V^C$, $W_Q^S$, $W_K^S$, $W_V^S$, $\alpha$ are adjustable parameters in a process of training the target analysis model.

By adjusting the parameters of each initial decoding layer, the generalization ability of the target language model may be improved. Meanwhile, parameters of the embedding layer are not adjustable. Thereby, the performance of the target language model may be improved, and the performance degrade is relieved.

S04: process the initial fusion result through the initial task analysis model to obtain predicted task information.

In some optional embodiments of the present application, the initial task analysis model includes an initial long short-term memory neural network and an initial multilayer perceptron. When the initial analysis model is trained to be a target analysis model, each initial task analysis model is trained to be a target task analysis model, the initial long short-term memory neural network is trained to be a target long short-term memory neural network, and the initial multilayer perceptron is trained to be a target multilayer perceptron. In the course of training the initial analysis model to be the target analysis model, parameters in the initial multi-layer perceptron and the initial long-short-term memory neural network are adjustable.

Optionally, the predicted task information may include predicted pose information of the sample action execution apparatus and a predicted working state of the sample action execution apparatus.

S05, obtain predetermined label task information corresponding to the sample image information.

The label task information may be marked by the related personnel. Specifically, the label task information may include label pose information of the sample action execution apparatus and a label working state of the sample action execution apparatus.

S06: determine a corresponding loss result based on the label task information and the predicted task information.

In some optional embodiments of the present application, in the foregoing S06, determining a corresponding loss result based on the label task information and the predicted task information may be implemented with the following formula (10):

$$\ell = \sum_t MSE(a1_t^{pose}, \hat{a}_t^{pose}) + \lambda_{gripper} BCE(a1_t^{gripper}, \hat{a}_t^{gripper}) \quad (10)$$

where $\lambda_{gripper}$ represents an adjustable parameter, $l$ represents the loss result, $a_t^{pose}$ represents the label pose information of the sample action execution apparatus, $\hat{a}_t^{gripper}$ represents the label working state of the sample action execution apparatus, $\alpha 1_t^{pose}$ represents the predicted pose information of the sample action execution apparatus, and $\alpha 1_t^{gripper}$ represents the predicted working state of the sample action execution apparatus.

S07: train the initial analysis model based on the loss result to obtain the target analysis model.

Optionally, in the foregoing S07, training the initial analysis model based on the loss result to obtain the target analysis model includes: determining whether the loss result is less than a predetermined threshold, if so, taking the most recently determined initial analysis model as the target analysis model. If the loss result is no less than the predetermined threshold, the parameters in the initial analysis model are adjusted based on the loss result to obtain a new initial analysis model. Furthermore, return to execute the step of processing the sample image information through the initial visual encoding model to obtain a corresponding target sample sequence, until the loss result is less than the predetermined threshold and the target analysis model is determined.

In embodiments of the present application, a performance test experiment of the target analysis model in the present application is performed based on a CALVIN (Composting Actions from Language and Vision) open source data set, so as to verify that the target analysis model in the present application has good model performance.

The CALVIN dataset is a dataset used to train and evaluate cross-modal generative model. It contains multiple types of actions extracted from images and text, as well as combinations of these actions. The CALVIN data set includes four environments of A, B, C, and D. The term "environment" may be construed as different types of scenes or backgrounds. Each environment corresponds to a specific subset of a data set. For example, the A environment corresponds to a daily home environment, such as a kitchen, a bedroom, etc.; the B environment corresponds to a public place, such as a coffee shop, a restaurant, etc.; the C environment corresponds to a work place, such as an office, a conference room, etc.; and the D environment corresponds to an outdoor environment, such as a park or a beach.

Specifically, the experimental data indicates that: compared with the target analysis model, the accuracy of the RT-1 method and the accuracy of the HULC method in various tasks with different difficulty both are lower than the target analysis model in the present application when training with a training set containing language and four scenarios A, B, C, and D, and testing with a testing set containing only D scenario. It is shown that the imitation ability of the target analysis model in the present application on a given training data is superior to both RT-1 and HULC.

In addition, when training is performed using a training set including three scenarios of A, B, and C, and a test set containing only the D scenario is used for testing, the accuracy of the MCIL method, the RT-1 method, and the HULC method in various different difficulty tasks is much lower than the target analysis model in the present application. It is shown that the performance capability of the target analysis model for the invisible task is far better than that of the MCIL method, the RT-1 method and the HULC method, and the generalization ability of the target analysis model is very excellent.

Figure 3:
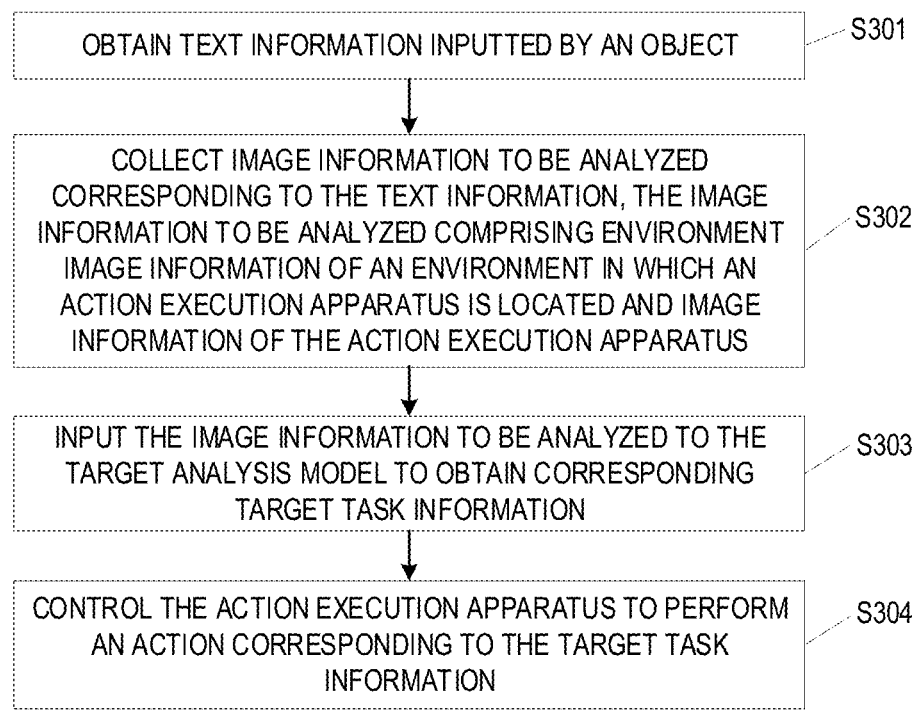
FIG. 3 is a schematic flowchart of a task execution method according to an embodiment of the present application.

Furthermore, FIG. 3 is a schematic flowchart of a task execution method according to an example embodiment of the present application. The method may include the following S301-S304:

S301: obtain text information inputted by an object.

The object may refer to a user, or may trigger a predetermined instruction of text information input action.

S302: collect image information to be analyzed corresponding to the text information, the image information to be analyzed comprising environment image information of an environment in which an action execution apparatus is located and image information of the action execution apparatus.

S303: input the image information to be analyzed to the target analysis model to obtain corresponding target task information.

S304: control the action execution apparatus to perform an action(s) corresponding to the target task information. The target analysis model may be the target analysis model in the embodiments corresponding to FIG. 2a, and the structure of the target analysis model may refer to the foregoing content, and thus details are not described herein again.

In some optional embodiments of the present application, the method further includes: obtaining voice information of the input; and determining the text information based on the voice information.

Figure 4:
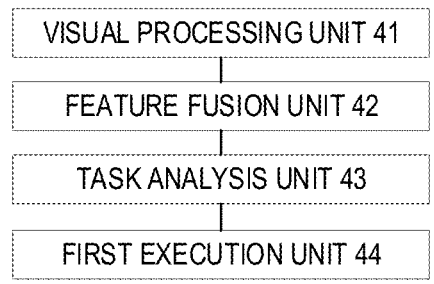
FIG. 4 is a schematic structural diagram of an information processing apparatus according to an embodiment of the present application.

FIG. 4 is a schematic structural diagram of a data processing apparatus according to an example embodiment of the present application. The apparatus includes: a visual processing unit 41 configured for processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus; a feature fusion unit 42 configured for fusing, through a target feature fusion model in the target analysis model, the target sequence and obtained text information to be analyzed, to obtain a target fusion result; a task analysis unit 43 configured for processing the target fusion result through a target task analysis model in the target analysis model to obtain target task information; and a first execution unit 44 configured for controlling the action execution apparatus to perform an action corresponding to the target task information. The target analysis model is obtained by training an initial analysis model. The initial analysis model comprises an initial visual encoding model and an initial feature fusion model. During the initial analysis model being trained to be the target analysis model, the initial visual encoding model is trained to be the target visual encoding model, and the initial feature fusion model is trained to be the target feature fusion model. At least one of the initial visual encoding model or the initial feature fusion model is obtained by pre-training.

In some embodiments, the target task information comprises target pose information of the action execution apparatus and a target working state of the action execution apparatus, and the target working state comprises a pick-up state and a non-pick-up state. When being used for controlling the action execution apparatus to perform the action corresponding to the target task information, the information processing apparatus is specifically configured for: adjusting a current pose of the action execution apparatus to be a pose corresponding to the target pose information; and adjusting a current working state of the action execution apparatus to be the target working state.

In some embodiments, the target task analysis model comprises a target long short-term memory neural network and a target multilayer perceptron. When being used for processing the target fusion result through the target task analysis model in the target analysis model to obtain the target task information, the information processing apparatus is specifically configured for: obtaining historical feature information, the historical feature information being a first output result based on the target long short-term memory neural network at the last time; processing the target fusion result and the historical feature information through the target long short-term memory neural network to obtain a second output result; and processing the second output result through the target multi-layer perceptron to obtain the target task information.

In some embodiments, the target visual encoding model comprises a visual converter unit and a target resampling unit. When being used for processing, through the target visual encoding model in the target analysis model, the obtained image information to be analyzed, to obtain the corresponding target sequence, the information processing device is specifically configured for: processing the image information to be analyzed through the visual converter unit to obtain a corresponding first initial sequence; and resampling the first initial sequence through the target resampling unit to obtain the target sequence.

In some embodiments, the target feature fusion model comprises a tokenization unit, an embedding layer, and a target language model. When being used for fusing, through the target feature fusion model in the target analysis model, the target sequence and the obtained text information to be analyzed, to obtain the target fusion result, the information processing apparatus is specifically configured for: performing tokenization processing on the obtained text information to be analyzed through the tokenization unit to obtain a tokenization result; processing the tokenization result through the embedding layer to obtain a corresponding tokenization vector; and processing the tokenization vector and the target sequence through the target language model to obtain the target fusion result.

In some embodiments, the target language model comprises a plurality of target decoding layers, and each target decoding layer comprises a target cross-attention layer and a self-attention layer. When being used for processing the tokenization vector and the target sequence through the target language model to obtain the target fusion result, the information processing apparatus is specifically configured for: processing the tokenization vector and the target sequence through a target cross-attention layer in the first target decoding layer among the plurality of target decoding layers to obtain a corresponding third output result; and processing the third output result through a self-attention layer in the first target decoding layer to obtain a first fusion result; processing the first fusion result and the target sequence through a target cross-attention layer in the second target decoding layer among the plurality of target decoding layers to obtain a corresponding fourth output result; and processing the fourth output result through a self-attention layer in the second target decoding layer to obtain a second fusion result; and determining whether a loop of all target decoding layers in the plurality of target decoding layers is completed, in accordance with a determination that the loop is completed, taking the second fusion result as the target fusion result, in accordance with a determination that the loop is not completed, determining the second target decoding layer as a new second target decoding layer, taking the second fusion result as a new first fusion result, and returning to the step of processing the first fusion result and the target sequence through a target cross-attention layer in the second target decoding layer among the plurality of target decoding layers until the target fusion result is determined.

In some embodiments, the information processing apparatus is further configured for: obtaining sample image information, the sample image information comprising environment image information of an environment in which a sample action execution apparatus is located and image information of the sample action execution apparatus; processing the sample image information through the initial visual encoding model to obtain a corresponding target sample sequence; fusing the target sample sequence and obtained sample text information through the initial feature fusion model to obtain a target sample fusion result, the sample text information corresponding to the sample image information; processing the target sample fusion result through the initial task analysis model to obtain predicted task information; obtaining predetermined label task information corresponding to the sample image information; determining a corresponding loss result based on the label task information and the predicted task information; and training the initial analysis model based on the loss result to obtain the target analysis model.

Figure 5:
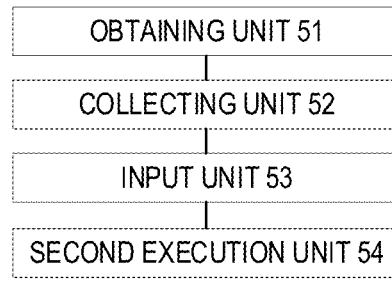
FIG. 5 is a schematic structural diagram of a task execution apparatus according to an embodiment of the present application.

FIG. 5 is a schematic structural diagram of a task execution apparatus according to an example embodiment of the present application. The apparatus is applicable to an intelligent robot and comprises: an obtaining unit 51 configured for obtaining text information inputted by an object; an collecting unit 52 configured for collecting image information to be analyzed corresponding to the text information, the image information to be analyzed comprising environment image information of an environment in which an action execution apparatus is located and image information of the action execution apparatus; an input unit 53 configured for inputting the image information to be analyzed to the target analysis model to obtain corresponding target task information; and a second execution unit 54 configured for controlling the action execution apparatus to perform an action corresponding to the target task information. The target analysis model is any one of the above-described target analysis models.

Optionally, the apparatus is further configured for: obtaining voice information of the input; and determining the text information based on the voice information.

It should be understood that the apparatus embodiments and the method embodiments may correspond to each other, and similar descriptions may refer to the method embodiments. To avoid repetition, details are not described herein again. Specifically, the apparatus may perform the foregoing method embodiments, and the foregoing and other operations and/or functions of each module in the apparatus are respectively corresponding processes in the methods in the foregoing method embodiments.

The apparatus according to embodiments of the present application is described above in combination with the accompanying drawings in terms of functional modules. It should be understood that the functional modules may be implemented in hardware, or may be implemented by using instructions in a form of software, or may be implemented by combining hardware and software modules. Specifically, steps in the method embodiments according to embodiments of the present application may be completed by using an integrated logic circuit of hardware in a processor and/or instructions in a form of software, and steps of the method disclosed in this embodiment of the present application may be directly embodied as execution of a hardware decoding processor, or performed by a combination of hardware and software modules in a decoding processor. Optionally, the software module may be located in a mature storage medium in the art such as a random access memory, a flash memory, a read-only memory, a programmable read-only memory, an electrically erasable programmable memory, a register, and the like. The storage medium is located in the memory, the processor reads information in the memory, and completes the steps in the foregoing method embodiments in combination with hardware of the storage medium.

Figure 6:
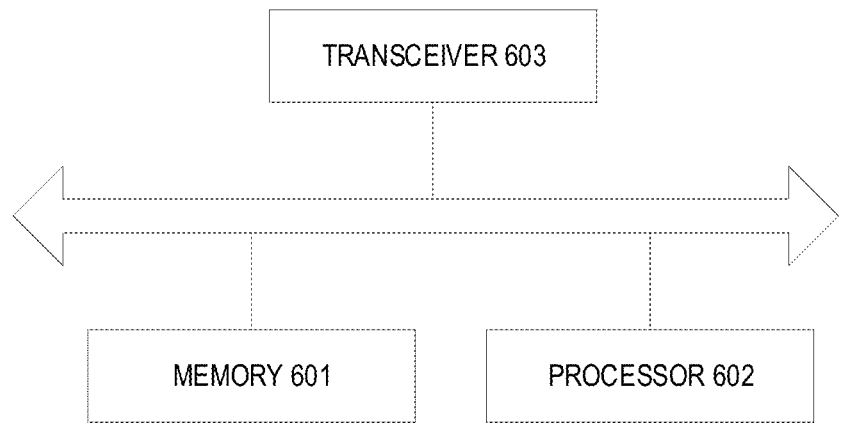
FIG. 6 is a schematic structural diagram of an electronic device according to an embodiment of the present application.

FIG. 6 is a schematic block diagram of an electronic device according to an embodiment of the present application.

The memory 601 is configured to store a computer program, and transmit the program code to the processor 602. In other words, the processor 602 may invoke computer program from the memory 601 and run the computer program to implement the method according to embodiments of the present application.

For example, the processor 602 may be configured to perform the foregoing method embodiments based on the instructions in the computer program.

In some embodiments of the present application, the processor 602 may include, but is not limited to: a general-purpose processor, a digital signal processor (DSP), an application specific integrated circuit (ASIC), a field programmable gate array (FPGA), or any other programmable logic device, discrete gate or transistor logic device, discrete hardware component, or the like.

In some embodiments of the present application, the memory 601 includes, but is not limited to: volatile memory and/or non-volatile memory. The non-volatile memory may be a read-only memory (ROM), a programmable read-only memory (programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which serves as an external cache. By way of example and not limitation, many forms of RAM are available, such as Static Random Access Memory (Static RAM, SRAM), Dynamic Random Access Memory (Dynamic RAM, DRAM), Synchronous Dynamic Random Access Memory (SDRAM), Double Data Rate SDRAM (DDR SDRAM), Enhanced SDRAM (ESDRAM), Synch link DRAM (SLDRAM), and Direct Rambus RAM (DR RAM).

In some embodiments of the present application, the computer program may be divided into one or more modules, and the one or more modules are stored in the memory 601 and executed by the processor 602 to complete the method provided in the present application. The one or more modules may be a series of computer program instruction segments capable of completing a specific function, and the instruction segment is used to describe an execution process of the computer program in the electronic device.

As shown in FIG. 6, the electronic device may further include: a transceiver 603 which may be connected to the processor 602 or the memory 601. The processor 602 may control the transceiver 603 to communicate with another device, specifically, to send information or data to another device, or to receive information or data sent by another device. The transceiver 603 may include a transmitter and a receiver. The transceiver 603 may further include an antenna, and there may be one or more antennas.

It should be understood that each component in the electronic device is connected to the bus system. The bus system includes, in addition to a data bus, a power bus, a control bus, and a status signal bus.

The present application further provides a computer storage medium having a computer program stored thereon, and the computer program, when executed by a computer, causes the computer to perform the method according to the foregoing method embodiments. In other words, an embodiment of the present application further provides a computer program product including instructions, and the instruction, when executed by a computer, cause the computer to perform the method according to the foregoing method embodiments.

When implemented using software, it may be implemented in whole or in part in the form of a computer program product. The computer program product includes one or more computer instructions. When the computer program instructions are loaded and executed on a computer, the processes or functions according to the embodiments of the present application are all or partially generated. The computer may be a general purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from a website site, a computer, a server, or a data center to another website site, computer, server, or data center over a wired (e.g., coaxial cable, optical fiber, digital subscriber line (DSL)) or wireless (e.g., infrared, wireless, microwave, etc.). The computer-readable storage medium may be any available medium that may be accessed by a computer or a data storage device such as a server or a data center integrated with one or more available media. The usable medium may be a magnetic medium (for example, a floppy disk, a hard disk, a magnetic tape), an optical medium (for example, a digital video disc (DVD)), a semiconductor medium (for example, a solid state disk (SSD)), or the like.

According to one or more embodiments of the present application, there is provided an information processing method, including: processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus; fusing, through a target feature fusion model in the target analysis model, the target sequence and obtained text information to be analyzed, to obtain a target fusion result, the text information to be analyzed corresponding to the image information to be analyzed; processing the target fusion result through a target task analysis model in the target analysis model to obtain target task information; and controlling the action execution apparatus to perform an action corresponding to the target task information; wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training.

According to one or more embodiments of the present application, the target task information comprises target pose information of the action execution apparatus and a target working state of the action execution apparatus, and the target working state comprises a pick-up state and a non-pick-up state. Controlling the action execution apparatus to perform the action corresponding to the target task information comprises: adjusting a current pose of the action execution apparatus to be a pose corresponding to the target pose information; and adjusting a current working state of the action execution apparatus to be the target working state.

According to one or more embodiments of the present application, the target task analysis model comprises a target long short-term memory neural network and a target multilayer perceptron. Processing the target fusion result through the target task analysis model in the target analysis model to obtain the target task information comprises: obtaining historical feature information, the historical feature information being a first output result based on the target long short-term memory neural network at the last time; processing the target fusion result and the historical feature information through the target long short-term memory neural network to obtain a second output result; and processing the second output result through the target multilayer perceptron to obtain the target task information.

According to one or more embodiments of the present application, the target visual encoding model comprises a visual converter unit and a target resampling unit. Processing, through the target visual encoding model in the target analysis model, the obtained image information to be analyzed, to obtain the corresponding target sequence comprises: processing the image information to be analyzed through the visual converter unit to obtain a corresponding first initial sequence; and resampling the first initial sequence through the target resampling unit to obtain the target sequence.

According to one or more embodiments of the present application, the target feature fusion model comprises a tokenization unit, an embedding layer, and a target language model. Fusing, through the target feature fusion model in the target analysis model, the target sequence and the obtained text information to be analyzed, to obtain the target fusion result comprises: performing tokenization processing on the obtained text information to be analyzed through the tokenization unit to obtain a tokenization result; processing the tokenization result through the embedding layer to obtain a corresponding tokenization vector; and processing the tokenization vector and the target sequence through the target language model to obtain the target fusion result.

According to one or more embodiments of the present application, the target language model comprises a plurality of target decoding layers, and each target decoding layer comprises a target cross-attention layer and a self-attention layer. Processing the tokenization vector and the target sequence through the target language model to obtain the target fusion result comprises: processing the tokenization vector and the target sequence through a target cross-attention layer in the first target decoding layer among the plurality of target decoding layers to obtain a corresponding third output result; and processing the third output result through a self-attention layer in the first target decoding layer to obtain a first fusion result; processing the first fusion result and the target sequence through a target cross-attention layer in the second target decoding layer among the plurality of target decoding layers to obtain a corresponding fourth output result; and processing the fourth output result through a self-attention layer in the second target decoding layer to obtain a second fusion result; and determining whether a loop of all target decoding layers in the plurality of target decoding layers is completed, in accordance with a determination that the loop is completed, taking the second fusion result as the target fusion result, in accordance with a determination that the loop is not completed, determining the second target decoding layer as a new second target decoding layer, taking the second fusion result as a new first fusion result, and returning to the step of processing the first fusion result and the target sequence through a target cross-attention layer in the second target decoding layer among the plurality of target decoding layers until the target fusion result is determined.

According to one or more embodiments of the present application, the method further includes: obtaining sample image information, the sample image information comprising environment image information of an environment in which a sample action execution apparatus is located and image information of the sample action execution apparatus; processing the sample image information through the initial visual encoding model to obtain a corresponding target sample sequence; fusing the target sample sequence and obtained sample text information through the initial feature fusion model to obtain a target sample fusion result, the sample text information corresponding to the sample image information; processing the target sample fusion result through the initial task analysis model to obtain predicted task information; obtaining predetermined label task information corresponding to the sample image information; determining a corresponding loss result based on the label task information and the predicted task information; and training the initial analysis model based on the loss result to obtain the target analysis model.

According to one or more embodiments of the present application, there is provided a task execution method applicable to an intelligent robot. The method includes: obtaining text information inputted by an object; collecting image information to be analyzed corresponding to the text information, the image information to be analyzed comprising environment image information of an environment in which an action execution apparatus is located and image information of the action execution apparatus; inputting the image information to be analyzed to the target analysis model to obtain corresponding target task information; and controlling the action execution apparatus to perform an action corresponding to the target task information, wherein the target analysis model is the target analysis model according to any of the above-described information processing methods.

According to one or more embodiments of the present application, the task execution method further includes: obtaining voice information of the input; and determining the text information based on the voice information.

According to one or more embodiments of the present application, there is provided an information processing apparatus, including: a visual processing unit, configured for processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus; a feature fusion unit, configured for fusing, through a target feature fusion model in the target analysis model, the target sequence and obtained text information to be analyzed, to obtain a target fusion result; a task analysis unit, configured for processing the target fusion result through a target task analysis model in the target analysis model to obtain target task information; and an execution unit, configured for controlling the action execution apparatus to perform an action corresponding to the target task information; wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training.

According to one or more embodiments of the present application, the target task information comprises target pose information of the action execution apparatus and a target working state of the action execution apparatus, and the target working state comprises a pick-up state and a non-pick-up state. When being used for controlling the action execution apparatus to perform the action corresponding to the target task information, the information processing apparatus is specifically configured for: adjusting a current pose of the action execution apparatus to be a pose corresponding to the target pose information; and adjusting a current working state of the action execution apparatus to be the target working state.

According to one or more embodiments of the present application, the target task analysis model comprises a target long short-term memory neural network and a target multilayer perceptron. When being used for processing the target fusion result through the target task analysis model in the target analysis model to obtain the target task information, the information processing apparatus is specifically configured for: obtaining historical feature information, the historical feature information being a first output result based on the target long short-term memory neural network at the last time; processing the target fusion result and the historical feature information through the target long short-term memory neural network to obtain a second output result; and processing the second output result through the target multi-layer perceptron to obtain the target task information.

According to one or more embodiments of the present application, the target visual encoding model comprises a visual converter unit and a target resampling unit. When being used for processing, through the target visual encoding model in the target analysis model, the obtained image information to be analyzed, to obtain the corresponding target sequence, the information processing device is specifically configured for: processing the image information to be analyzed through the visual converter unit to obtain a corresponding first initial sequence; and resampling the first initial sequence through the target resampling unit to obtain the target sequence.

According to one or more embodiments of the present application, the target feature fusion model comprises a tokenization unit, an embedding layer, and a target language model. When being used for fusing, through the target feature fusion model in the target analysis model, the target sequence and the obtained text information to be analyzed, to obtain the target fusion result, the information processing apparatus is specifically configured for: performing tokenization processing on the obtained text information to be analyzed through the tokenization unit to obtain a tokenization result; processing the tokenization result through the embedding layer to obtain a corresponding tokenization vector; and processing the tokenization vector and the target sequence through the target language model to obtain the target fusion result.

According to one or more embodiments of the present application, the target language model comprises a plurality of target decoding layers, and each target decoding layer comprises a target cross-attention layer and a self-attention layer. When being used for processing the tokenization vector and the target sequence through the target language model to obtain the target fusion result, the information processing apparatus is specifically configured for: processing the tokenization vector and the target sequence through a target cross-attention layer in the first target decoding layer among the plurality of target decoding layers to obtain a corresponding third output result; and processing the third output result through a self-attention layer in the first target decoding layer to obtain a first fusion result; processing the first fusion result and the target sequence through a target cross-attention layer in the second target decoding layer among the plurality of target decoding layers to obtain a corresponding fourth output result; and processing the fourth output result through a self-attention layer in the second target decoding layer to obtain a second fusion result; and determining whether a loop of all target decoding layers in the plurality of target decoding layers is completed, in accordance with a determination that the loop is completed, taking the second fusion result as the target fusion result, in accordance with a determination that the loop is not completed, determining the second target decoding layer as a new second target decoding layer, taking the second fusion result as a new first fusion result, and returning to the step of processing the first fusion result and the target sequence through a target cross-attention layer in the second target decoding layer among the plurality of target decoding layers until the target fusion result is determined.

According to one or more embodiments of the present application, the information processing apparatus is further configured for: obtaining sample image information, the sample image information comprising environment image information of an environment in which a sample action execution apparatus is located and image information of the sample action execution apparatus; processing the sample image information through the initial visual encoding model to obtain a corresponding target sample sequence; fusing the target sample sequence and obtained sample text information through the initial feature fusion model to obtain a target sample fusion result, the sample text information corresponding to the sample image information; processing the target sample fusion result through the initial task analysis model to obtain predicted task information; obtaining predetermined label task information corresponding to the sample image information; determining a corresponding loss result based on the label task information and the predicted task information; and training the initial analysis model based on the loss result to obtain the target analysis model.

According to one or more embodiments of the present application, there is provided an electronic device, including: a processor; and a memory configured to store executable instructions of the processor; wherein the processor is configured to perform, any of the above-described method.

According to one or more embodiments of the present application, there is provided a computer-readable storage medium having a computer program stored thereon. The computer program when executed by a processor, implements any of the above-described method.

Those of ordinary skill in the art will appreciate that the modules and algorithm steps of the examples described in connection with the embodiments disclosed herein may be implemented in electronic hardware, or in combination of computer software and electronic hardware. Whether these functions are performed in hardware or software depends on the specific application and design constraints of the technical solutions. Those skilled in the art may use different methods for each particular application to implement the described functionality, but such implementations should not be considered to be beyond the scope of the present application.

In the several embodiments provided in the present application, it should be understood that the disclosed systems, apparatuses, and methods may be implemented in other manners. For example, the apparatus embodiments described above are merely illustrative, for example, the division of the modules is merely a logical function division, and in actual implementation, there may be another division manner, for example, multiple modules or components may be combined or may be integrated into another system, or some features may be ignored, or not executed. Alternatively, the mutual coupling or direct coupling or communication connection shown or discussed may be an indirect coupling or communication connection through some interfaces, devices, or modules, and may be in electrical, mechanical, or other forms.

The modules described as separate components may or may not be physically separate, and the components displayed as modules may or may not be physical modules, that is, may be located in one place, or may be distributed to multiple network units. Some or all of the modules may be selected according to actual needs to achieve the purpose of the solution of this embodiment. For example, each functional module in the embodiments of the present application may be integrated into one processing module, or may be separately physically present by each module, or may be integrated in one module by two or more modules.

The foregoing is only specific embodiments of the present application, but the protection scope of the present application is not limited thereto, and any person skilled in the art may easily conceive of variations or replacements within the technical scope of the present application, and should be covered within the protection scope of the present application. Therefore, the protection scope of the present application should be based on the protection scope of the claims.

We claim:

1. An information processing method, comprising:
processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus;
fusing, through a target feature fusion model in the target analysis model, the target sequence and obtained text information to be analyzed, to obtain a target fusion result, the text information to be analyzed corresponding to the image information to be analyzed;
processing the target fusion result through a target task analysis model in the target analysis model to obtain target task information;
controlling the action execution apparatus to perform an action corresponding to the target task information; and
wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model;

and at least one of the initial visual encoding model or the initial feature fusion model is obtained by pre-training,
wherein the target task analysis model comprises a target long short-term memory neural network and a target multilayer perceptron, and processing the target fusion result through the target task analysis model in the target analysis model to obtain the target task information comprises:
obtaining historical feature information, the historical feature information being a first output result based on the target long short-term memory neural network at the last time;
processing the target fusion result and the historical feature information through the target long short-term memory neural network to obtain a second output result; and
processing the second output result through the target multi-layer perceptron to obtain the target task information.

2. The method of claim 1, wherein the target task information comprises target pose information of the action execution apparatus and a target working state of the action execution apparatus, and the target working state comprises a pick-up state and a non-pick-up state;
controlling the action execution apparatus to perform the action corresponding to the target task information comprises:
adjusting a current pose of the action execution apparatus to be a pose corresponding to the target pose information; and
adjusting a current working state of the action execution apparatus to be the target working state.

3. The method of claim 1, wherein the target visual encoding model comprises a visual converter unit and a target resampling unit, and processing, through the target visual encoding model in the target analysis model, the obtained image information to be analyzed, to obtain the corresponding target sequence comprises:
processing the image information to be analyzed through the visual converter unit to obtain a corresponding first initial sequence; and
resampling the first initial sequence through the target resampling unit to obtain the target sequence.

4. The method of claim 1, wherein the target feature fusion model comprises a tokenization unit, an embedding layer, and a target language model;
fusing, through the target feature fusion model in the target analysis model, the target sequence and the obtained text information to be analyzed, to obtain the target fusion result comprises:
performing tokenization processing on the obtained text information to be analyzed through the tokenization unit to obtain a tokenization result;
processing the tokenization result through the embedding layer to obtain a corresponding tokenization vector; and
processing the tokenization vector and the target sequence through the target language model to obtain the target fusion result.

5. The method of claim 4, wherein the target language model comprises a plurality of target decoding layers, and each target decoding layer comprises a target cross-attention layer and a self-attention layer;
processing the tokenization vector and the target sequence through the target language model to obtain the target fusion result comprises:
processing the tokenization vector and the target sequence through a target cross-attention layer in the first target decoding layer among the plurality of target decoding layers to obtain a corresponding third output result; and processing the third output result through a self-attention layer in the first target decoding layer to obtain a first fusion result;
processing the first fusion result and the target sequence through a target cross-attention layer in the second target decoding layer among the plurality of target decoding layers to obtain a corresponding fourth output result; and processing the fourth output result through a self-attention layer in the second target decoding layer to obtain a second fusion result; and
determining whether a loop of all target decoding layers in the plurality of target decoding layers is completed,
in accordance with a determination that the loop is completed, taking the second fusion result as the target fusion result,
in accordance with a determination that the loop is not completed, determining the second target decoding layer as a new second target decoding layer, taking the second fusion result as a new first fusion result, and returning to the step of processing the first fusion result and the target sequence through a target cross-attention layer in the second target decoding layer among the plurality of target decoding layers until the target fusion result is determined.

6. The method of claim 1, further comprising:
obtaining sample image information, the sample image information comprising environment image information of an environment in which a sample action execution apparatus is located and image information of the sample action execution apparatus;
processing the sample image information through the initial visual encoding model to obtain a corresponding target sample sequence;
fusing the target sample sequence and obtained sample text information through an initial feature fusion model to obtain a target sample fusion result, the sample text information corresponding to the sample image information;
processing the target sample fusion result through the initial task analysis model to obtain predicted task information;
obtaining predetermined label task information corresponding to the sample image information;
determining a corresponding loss result based on the label task information and the predicted task information; and
training the initial analysis model based on the loss result to obtain the target analysis model.

7. An electronic device, comprising:
a processor; and
a memory, configured to store executable instructions of the processor;
wherein the processor is configured to perform, by executing the executable instructions, acts comprising:
processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus;

fusing, through a target feature fusion model in the target analysis model, the target sequence and obtained text information to be analyzed, to obtain a target fusion result, the text information to be analyzed corresponding to the image information to be analyzed;

processing the target fusion result through a target task analysis model in the target analysis model to obtain target task information;

controlling the action execution apparatus to perform an action corresponding to the target task information; and wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training, wherein the target task analysis model comprises a target long short-term memory neural network and a target multilayer perceptron, and processing the target fusion result through the target task analysis model in the target analysis model to obtain the target task information comprises:

obtaining historical feature information, the historical feature information being a first output result based on the target long short-term memory neural network at the last time;

processing the target fusion result and the historical feature information through the target long short-term memory neural network to obtain a second output result; and processing the second output result through the target multi-layer perceptron to obtain the target task information.

8. The electronic device of claim 7, wherein the target task information comprises target pose information of the action execution apparatus and a target working state of the action execution apparatus, and the target working state comprises a pick-up state and a non-pick-up state;

controlling the action execution apparatus to perform the action corresponding to the target task information comprises:

adjusting a current pose of the action execution apparatus to be a pose corresponding to the target pose information; and adjusting a current working state of the action execution apparatus to be the target working state.

9. The electronic device of claim 7, wherein the target visual encoding model comprises a visual converter unit and a target resampling unit, and processing, through the target visual encoding model in the target analysis model, the obtained image information to be analyzed, to obtain the corresponding target sequence comprises:

processing the image information to be analyzed through the visual converter unit to obtain a corresponding first initial sequence; and resampling the first initial sequence through the target resampling unit to obtain the target sequence.

10. The electronic device of claim 7, wherein the target feature fusion model comprises a tokenization unit, an embedding layer, and a target language model;

fusing, through the target feature fusion model in the target analysis model, the target sequence and the obtained text information to be analyzed, to obtain the target fusion result comprises:

performing tokenization processing on the obtained text information to be analyzed through the tokenization unit to obtain a tokenization result;

processing the tokenization result through the embedding layer to obtain a corresponding tokenization vector; and processing the tokenization vector and the target sequence through the target language model to obtain the target fusion result.

11. The electronic device of claim 10, wherein the target language model comprises a plurality of target decoding layers, and each target decoding layer comprises a target cross-attention layer and a self-attention layer;

processing the tokenization vector and the target sequence through the target language model to obtain the target fusion result comprises:

processing the tokenization vector and the target sequence through a target cross-attention layer in the first target decoding layer among the plurality of target decoding layers to obtain a corresponding third output result; and processing the third output result through a self-attention layer in the first target decoding layer to obtain a first fusion result;

processing the first fusion result and the target sequence through a target cross-attention layer in the second target decoding layer among the plurality of target decoding layers to obtain a corresponding fourth output result; and processing the fourth output result through a self-attention layer in the second target decoding layer to obtain a second fusion result; and determining whether a loop of all target decoding layers in the plurality of target decoding layers is completed, in accordance with a determination that the loop is completed, taking the second fusion result as the target fusion result, in accordance with a determination that the loop is not completed, determining the second target decoding layer as a new second target decoding layer, taking the second fusion result as a new first fusion result, and returning to the step of processing the first fusion result and the target sequence through a target cross-attention layer in the second target decoding layer among the plurality of target decoding layers until the target fusion result is determined.

12. The electronic device of claim 7, wherein the acts further comprise:

obtaining sample image information, the sample image information comprising environment image information of an environment in which a sample action execution apparatus is located and image information of the sample action execution apparatus;

processing the sample image information through the initial visual encoding model to obtain a corresponding target sample sequence;

fusing the target sample sequence and obtained sample text information through an initial feature fusion model to obtain a target sample fusion result, the sample text information corresponding to the sample image information;

processing the target sample fusion result through the initial task analysis model to obtain predicted task information;

obtaining predetermined label task information corresponding to the sample image information;

determining a corresponding loss result based on the label task information and the predicted task information; and training the initial analysis model based on the loss result to obtain the target analysis model.

13. A non-transitory computer-readable storage medium having a computer program stored thereon, wherein the computer program, when executed by a processor, causes the processor to perform acts comprising:

processing, through a target visual encoding model in a target analysis model, obtained image information to be analyzed, to obtain a corresponding target sequence, the image information to be analyzed comprising environment image information of an environment in which an action execution apparatus is located and image information of the action execution apparatus;

fusing, through a target feature fusion model in the target analysis model, the target sequence and obtained text information to be analyzed, to obtain a target fusion result, the text information to be analyzed corresponding to the image information to be analyzed;

processing the target fusion result through a target task analysis model in the target analysis model to obtain target task information;

controlling the action execution apparatus to perform an action corresponding to the target task information; and wherein the target analysis model is obtained by training an initial analysis model; the initial analysis model comprises an initial visual encoding model and an initial feature fusion model; during the initial analysis model being trained to be the target analysis model, the initial visual encoding model is trained to be the target visual encoding model, and the initial feature fusion model is trained to be the target feature fusion model; and at least one of the initial visual encoding model or the initial feature fusion model is obtained by pre-training, wherein the target task analysis model comprises a target long short-term memory neural network and a target multilayer perceptron, and processing the target fusion result through the target task analysis model in the target analysis model to obtain the target task information comprises:

obtaining historical feature information, the historical feature information being a first output result based on the target long short-term memory neural network at the last time;

processing the target fusion result and the historical feature information through the target long short-term memory neural network to obtain a second output result; and processing the second output result through the target multi-layer perceptron to obtain the target task information.

14. The non-transitory computer-readable storage medium of claim 13, wherein the target task information comprises target pose information of the action execution apparatus and a target working state of the action execution apparatus, and the target working state comprises a pick-up state and a non-pick-up state;

controlling the action execution apparatus to perform the action corresponding to the target task information comprises:

adjusting a current pose of the action execution apparatus to be a pose corresponding to the target pose information; and adjusting a current working state of the action execution apparatus to be the target working state.

15. The non-transitory computer-readable storage medium of claim 13, wherein the target visual encoding model comprises a visual converter unit and a target resampling unit, and processing, through the target visual encoding model in the target analysis model, the obtained image information to be analyzed, to obtain the corresponding target sequence comprises:

processing the image information to be analyzed through the visual converter unit to obtain a corresponding first initial sequence; and resampling the first initial sequence through the target resampling unit to obtain the target sequence.

16. The non-transitory computer-readable storage medium of claim 13, wherein the target feature fusion model comprises a tokenization unit, an embedding layer, and a target language model;

fusing, through the target feature fusion model in the target analysis model, the target sequence and the obtained text information to be analyzed, to obtain the target fusion result comprises:

performing tokenization processing on the obtained text information to be analyzed through the tokenization unit to obtain a tokenization result;

processing the tokenization result through the embedding layer to obtain a corresponding tokenization vector; and processing the tokenization vector and the target sequence through the target language model to obtain the target fusion result.

17. The non-transitory computer-readable storage medium of claim 16, wherein the target language model comprises a plurality of target decoding layers, and each target decoding layer comprises a target cross-attention layer and a self-attention layer;

processing the tokenization vector and the target sequence through the target language model to obtain the target fusion result comprises:

processing the tokenization vector and the target sequence through a target cross-attention layer in the first target decoding layer among the plurality of target decoding layers to obtain a corresponding third output result; and processing the third output result through a self-attention layer in the first target decoding layer to obtain a first fusion result;

processing the first fusion result and the target sequence through a target cross-attention layer in the second target decoding layer among the plurality of target decoding layers to obtain a corresponding fourth output result; and processing the fourth output result through a self-attention layer in the second target decoding layer to obtain a second fusion result; and determining whether a loop of all target decoding layers in the plurality of target decoding layers is completed, in accordance with a determination that the loop is completed, taking the second fusion result as the target fusion result, in accordance with a determination that the loop is not completed, determining the second target decoding layer as a new second target decoding layer, taking the second fusion result as a new first fusion result, and returning to the step of processing the first fusion result and the target sequence through a target cross-attention layer in the second target decoding layer among the plurality of target decoding layers until the target fusion result is determined.

\* \* \* \* \*